Dec. 31, 1940.
L. A. RICE
2,226,910
SUPPORT FOR ROTARY KILNS AND THE LIKE
Filed Sept. 23, 1940
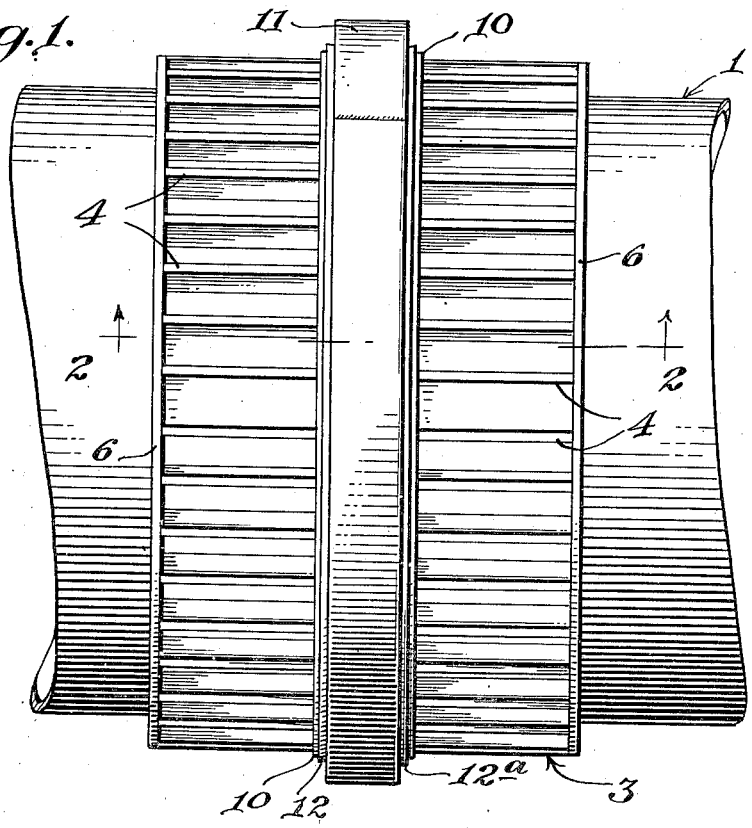
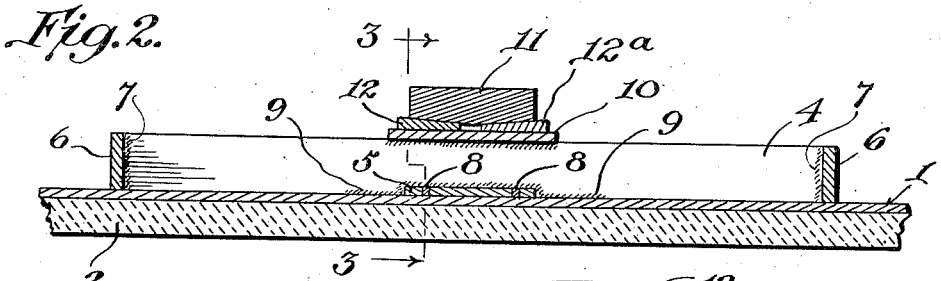
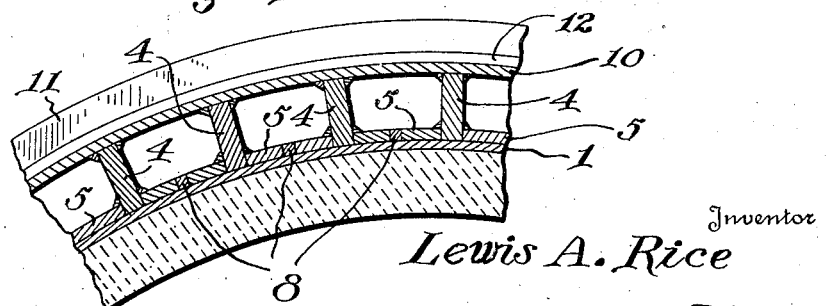
Inventor
Lewis A. Rice Patented Dec. 31, 1940

2,226,910

UNITED STATES PATENT OFFICE 2,226,910

SUPPORT FOR ROTARY KILNS AND THE LIKE

Lewis A. Rice, Allentown, Pa., assignor to Traylor Engineering and Manufacturing Company, Allentown, Pa., a corporation of Delaware Application September 23, 1940, Serial No. 357,979

5 Claims. (Cl. 263—32)

This invention relates to supports for horizontal rotary kilns and the like, and more particularly to means for mounting the riding rings upon such kilns.

Horizontal rotary kilns used for the production of Portland cement are provided with firebrick linings to insulate the cylindrical metal shells from the intense heat generated therein. As the thickness of this lining decreases with use, due to abrasion and spalling, overheating of the shell occurs, with the result that the shell may sometimes become red hot. This is particularly true when the kiln is lined with a grade of firebrick that is not a good insulator and which readily transmits heat to the shell by conduction and radiation. When such overheating occurs in localities adjacent the riding rings, stresses caused of expansion of the shell plate and also by the shearing pressure exerted by the rings, cause the shell to bulge and buckle and get out of shape with resultant injury to the kiln.

For the purpose of avoiding such deformation, it is common practice to apply wrapper plates around the circumference of the shell to support the riding rings and to distribute the pressure exerted by such rings over a wide area upon the surface of the shell. While the riding rings encircling the shell prevent the latter from expanding in an outward direction, the wrapper plates are only partially effective to restrain the shell from buckling inwardly because of the liability of the rivets or bolts securing the wrapper plates to the shell to shear off and allow the shell to strip away from the wrapper plates. Furthermore, the wrapper plates in order to serve their intended function are necessarily of appreciable thickness so that they materially retard the dissipation of the heat from the shell to the surrounding atmosphere and this further contributes to the overheating of the shell.

It is an important object of my invention to provide means for fastening the riding rings to the shell of a horizontal rotary kiln or the like which reduce the tendency to overheating of the shell and which at the same time provide an effective reinforcement against the distortion of the shell out of true cylindrical shape.

More particularly my invention has for an object to provide a circular cage or grille adapted to encircle the circumference of the shell and provide a rigid and ventilated support for transmitting the load to a riding ring. Such construction permits the heat radiated through the shell to freely escape to the atmosphere without overheating the shell or the cage. The cage preferably is so connected to the shell as to allow differential expansion and contraction between the shell and the cage, and is so arranged as to distribute the reaction pressure of the riding ring over a relatively wide circumferential area of the shell.

Other objects and advantages will be apparent from the following detailed description of a preferred embodiment of my invention, reference being had to the annexed drawing in which:

Figure 1 is a longitudinal view, in side elevation, of an intermediate portion of a horizontal rotary kiln, showing the cage support for a riding ring;

Figure 2 is a transverse cross-sectional view through the riding ring and support on the line 2—2 of Fig. 1; and Figure 3 is a circumferential in part cross-sectional view of a part of the riding ring and support on the line 3—3 of Fig. 2.

Referring to the embodiment of the invention shown in the drawing, I represents the metal shell of a horizontal rotary kiln of the type which is supported upon rollers located at spaced distances throughout its length and rotated about its longitudinal axis, usually by means of a motor driven pinion engaging a ring gear surrounding and connected to the shell. The gear and pinion driving means are not shown since such structure is well known in the art. The shell is interiorly lined with firebricks 2 to withstand the intense heat of the burner flame within the kiln such, for example, as is required for the production of clinker in the manufacture of Portland cement.

Encircling the circumference of the shell is a cage 3 comprising a series of flat closely spaced bars 4 having edge contact with the shell and extending a substantial distance longitudinally thereof. These bars are maintained in laterally spaced relation by means of segmental blocks 5 interposed between and welded to the bars and together extending about the circumference of the shell. For tying together the ends of the bars 4 are ring plates 6, these ring plates encircling the shell and being welded, as indicated at 7, to opposite ends of the bars. The bars 4 support upon their upper edges a strap 10 encircling the cage in the vicinity of its midportion, this strap being welded to the bars and overlying such bars only for a portion of their length. The bars 4, spacing blocks 5, ring plates 6 and strap 10 are thus welded together to form a rigid cage structure which girdles the circumference of the shell. This cage may be made in two semi-circular sections for convenient assembly upon the kiln, following which the sections are suitably welded together to form the complete cylindrical cage. The cage is fixedly secured to the shell by spot welding the spacing blocks to the shell, as indicated at 8 in Figs. 2 and 3, and also by individually welding the bars 4 to the shell adjacent their midsections only and upon opposite sides of the spacing blocks 5, as indicated at 9 in Fig. 2, so as to permit relative longitudinal expansion and contraction between the shell and the bars.

A riding ring 11 overlies the strap 10 and is solidly secured to the strap by means of wedge rings 12 and 12a which are driven from opposite sides into the space between the riding ring and strap, the inner circumference of the riding ring being tapered in reverse directions from its opposite sides inwardly to cooperate with the complementary tapered upper surfaces of the wedge rings, as best indicated in Fig. 2. The wedge rings after being driven home may be held in place by welding, or in any other convenient manner.

From the foregoing description it will be apparent that the cages encircling the kiln provide ventilated supports for the riding rings which are sufficiently strong and rigid to bear the load imposed upon it by the weight of the kiln and to distribute such load over a comparatively wide area upon the shell. By reason of the openwork cage construction the tendency for the shell to overheat adjacent the riding rings is reduced for the reason that air is free to flow between the riding ring and shell and carry off heat transmitted through the shell, and because, in a sense, the bars 4 function as fins for promoting the radiation of heat from the shell. Furthermore any tendency to buckling of the shell adjacent the riding rings is adequately resisted by the rigid cage structure which reinforces and holds the shell to true cylindrical shape.

The riding ring 11 may be made hollow if desired, in accordance with common practice, instead of solid, and also may be secured to the cage by means other than wedge rings, should this seem to be necessary or desirable. While the invention has been described specifically in connection with a rotary kiln, manifestly it is not restricted to such apparatus but may be applied to good advantage in other roller-supported cylinders that are exposed to high temperatures, such as rotary clinker coolers, driers, and the like. It is not intended to limit the invention to the exact details of construction herein shown and described, for obvious modifications within the scope of the claims may occur to persons skilled in the art.

I claim:

1. A support for rotary kilns and the like comprising a pair of ring plates adapted to encircle the kiln, a series of bars extending between and secured to the ring plates so as to form a cage surrounding the kiln and a strap overlying the bars for a portion of their length and forming a support for a riding ring.

2. A support for rotary kilns and the like comprising a pair of ring plates adapted to encircle the kiln, a series of bars extending between and secured to the ring plates so as to form a cage surrounding the kiln, spacing means extending between and secured to the bars, and a strap overlying the bars for a portion of their length and forming a support for a riding ring.

3. In an apparatus including a cylindrical shell adapted to be supported for rotation about a generally horizontal axis, means for supporting said shell at points spaced longitudinally of the shell, said supporting means comprising a pair of ring plates surrounding the shell, a series of relatively closely spaced bars extending between and secured to the ring plates so as to form a cage surrounding and reinforcing the shell to prevent distortion thereof, means extending between and secured to the bars, a strap overlying the bars for a portion of their length, a riding ring supported upon and fastened to the strap, and means securing the bars to the shell adjacent their midportions only to permit longitudinal expansion and contraction between the bars and shell, whereby a ventilated space is provided between the riding ring and shell and the bars serve as fins to promote dissipation of heat from the shell.

4. In an apparatus including a cylindrical shell adapted to be supported for rotation about a generally horizontal axis, means for supporting said shell at points spaced longitudinally of the shell, said supporting means comprising a pair of ring plates surrounding the shell, a series of flat bars disposed on edge extending between and secured to the ring plates at relatively closely spaced intervals so as to form a cage surrounding and reinforcing the shell to prevent distortion thereof, segmental spacer blocks extending between and secured to adjacent bars a strap overlying the bars throughout a comparatively narrow area adjacent the midsection of the cage, a riding ring supported upon and fastened to the strap, and means securing the segmental blocks to the shell, whereby a ventilated space is provided between the riding ring and shell and whereby the bars serve as fins to promote dissipation of heat from the shell.

5. In an apparatus including a cylindrical shell adapted to be supported for rotation about a generally horizontal axis, means for supporting said shell at points spaced longitudinally of the shell, said supporting means comprising a pair of ring plates surrounding the shell, a series of flat bars extending between and secured to the ring plates at relatively closely spaced intervals so as to form a cage surrounding and reinforcing the shell to prevent distortion thereof, said bars bearing against the shell along their longitudinal edges, segmental spacer blocks extending between and secured to adjacent bars, a strap overlying the bars throughout a comparatively narrow area adjacent the midsection of the cage, a riding ring encircling the strap, wedge rings intermediate the riding ring and the strap, and means securing the bars to the shell at locations adjacent the midsection of the cage only, whereby a ventilated space is provided between the riding ring and shell and whereby the bars permit expansion and contraction of the shell and serve as fins to promote the dissipation of heat from the shell.

LEWIS A. RICE.